Jan. 3, 1928.  
W. H. FLUKER  
LICENSE NUMBER PLATE  
Filed June 10, 1926  
1,655,363
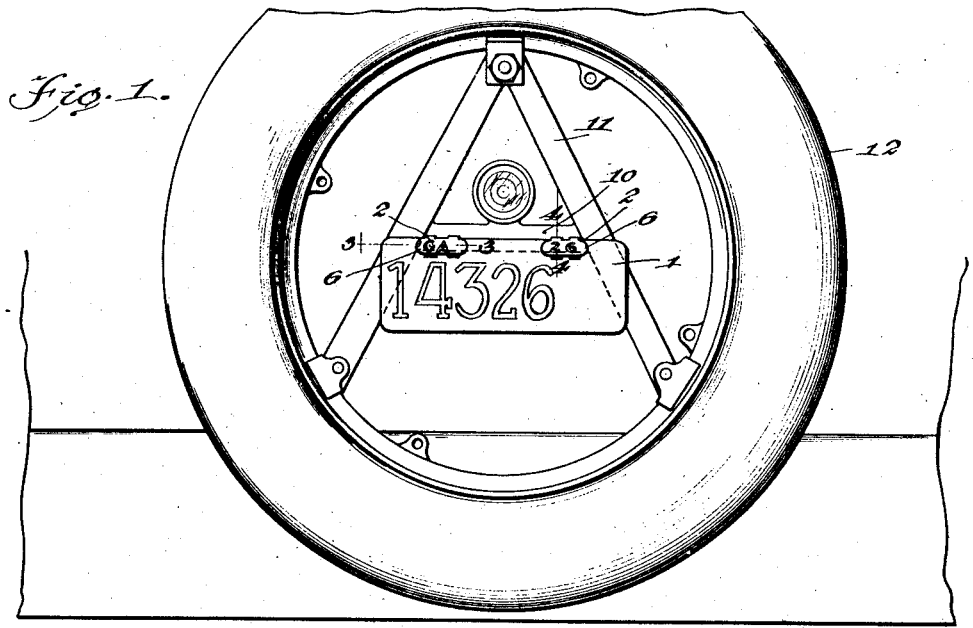
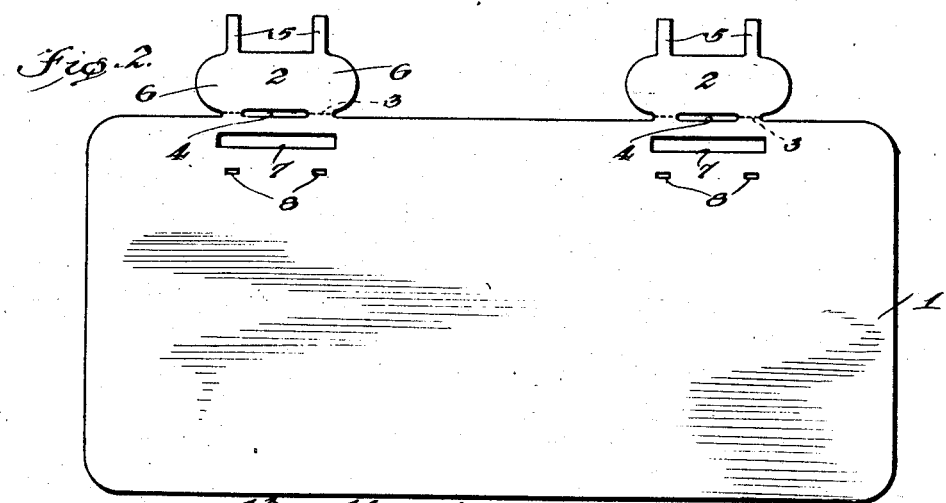
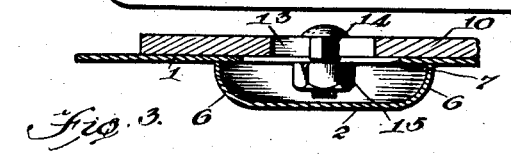
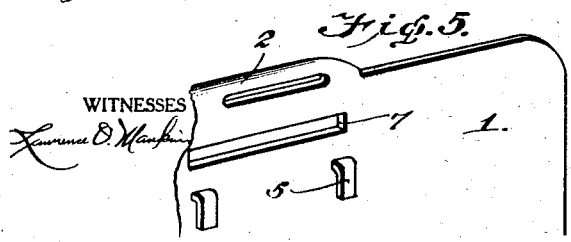
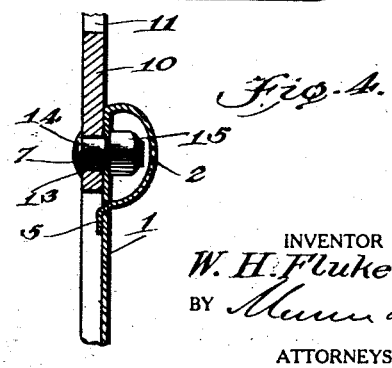
WITNESSES
INVENTOR  
W. H. Fluker,  
BY  
ATTORNEYS Patented Jan. 3, 1928.

1,655,363

UNITED STATES PATENT OFFICE.

WILLIAM H. FLUKER, OF THOMSON, GEORGIA.

LICENSE-NUMBER PLATE.

Application filed June 10, 1926. Serial No. 115,078.

My invention relates to improvements in license number plates for motor vehicles, and it consists in the combinations, constructions and arrangements herein described and claimed.

An object of the invention is the provision of a license number plate which has means for cooperating with the fastening devices, whereby the plate is secured in place on a motor vehicle or to a like support, to prevent accidental displacement of the license number plate and also to make difficult the removal of the license number plate from applied position.

A further object of the invention is the provision of a license number plate having bendable sealing members adapted to be bent to position to cooperate with the body of the license number plate to house the nuts on bolts which are employed to attach the number plate to a support, whereby accidental loosening and loss of the nuts are prevented and the sealing means of the plate cannot be displaced from position to house and retain the nuts in place without breaking the seal and destroying the usefulness of the entire plate.

Other objects and advantages of the invention will be apparent from the following description, considered in conjunction with the accompanying drawings, in which Figure 1 is a face view of a license number plate embodying the invention applied to a holder for a spare tire of a motor vehicle, Figure 2 is a plan view of the license number plate as it appears before indicia has been produced thereon and before the sealing members of the plate have been bent to operative positions.

Figure 3 is a relatively enlarged section substantially along the line 3—3 of Figure 1, Figure 4 is a similar section, taken substantially along the line 4—4 of Figure 1, Figure 5 is a fragmentary perspective view of an upper edge portion of the improved license number plate as viewed from the rear, showing the means for holding the sealing member of the plate in operative position.

A license number plate embodying the invention preferably is made of sheet metal and comprises a flat body 1 which may be substantially rectangular in configuration as shown in Figures 1 and 2 or which may have any other desirable configuration. A pair of flat sealing members 3 are integral with the body 1 at the upper edge of the body 1, being joined at their bottoms to the body 1 by portions of the body 1 which are weakened along the lines 3 by scoring and by the slots 4 or in any other suitable known manner. The sealing members 2 are adapted to be bent forwardly of the plane of the body 1 from the positions shown in Fig. 2 along the score lines 3 when desired and then downwardly to positions close to the rear face of the body 1.

The sealing members 2 are provided at their free longitudinal edges with readily bendable spaced fastening tabs 5 and with bendable end portions or flaps 6 which may have rounded or convexly curved edges as shown in Figure 2.

The body 1 of the number plate is formed with short horizontal slots 7 adjacent to but spaced from the bottoms of the sealing members 3 and also is formed with apertures 8 adjacent to and below the slots 7.

The license number plate may be secured in place on the cross bar 10 of the holder 11 for a spare tire 12 of a motor vehicle, the holder 11 being secured in any suitable known manner to the back part of a motor vehicle, as is usual. The cross bar 10 is formed with horizontal slots, as at 13 in Figs. 3 and 4, in register with the slots 7. As illustrated to advantage in Figures 3 and 4, the shank of a bolt 14 may be projected through aligned slots 13 and 7 so that the head of the bolt will be disposed at the inner side of the supporting bar 10 and a nut 15 may be screwed on the extending end portion of the shank of the bolt against the outer face of the body 1 of the number plate. The number plate thus will be clamped to the supporting bar 10. Prior to the present invention, it has been possible to remove a license number plate merely by loosening the nuts 15 or like fastening devices and moreover, the vibrations and stresses which result from the movements of the vehicle on which the license number plate is supported tend to cause loosening of the nuts 15 from positions to hold the license number plate in place. When a license number plate embodying the invention is applied, accidental loosening of the nuts 15 is prevented and the loosening of such nut as a result of manual action is rendered exceedingly difficult. These advantages are obtained by reason of the provision of the sealing members 2 which are bent, after the nuts 15 have been placed on the bolts 14, from the positions shown in Figure 2 along the lines 4 forwardly and downwardly across the outer ends of the bolts 14, the fastening tabs 5 then being projected through the apertures 8 and clinched against the rear face of the body 1 of the license number plate. The end portions and the free edges of the remaining portions of the sealing members 2 are bent against the front face of the body 1 at the time the tabs are projected through the apertures 8 and before the tabs have been clinched in place. Each sealing member 2 thus will cooperate with a portion of the body 1 of the number plate to provide a housing for the associated nut 15 and the outer end portion of the bolt with which the nut 15 is engaged. Accidental loosening and loss of the nut will be prevented and the removal of the license number plate as a result of manual action will be made difficult. After being bent and fastened in place, the sealing or housing members may have any desired indicia produced thereon, as for example a date or identification marking thereon, such as are usual for a license number plate.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A license number plate having a pair of spaced openings adjacent to one edge thereof for the reception of bolts for supporting the body of the plate, and a pair of sealing members integral with said body adjacent to said openings, said sealing members being bendable from the plane of the body across the adjacent ends of said bolts, said body having other openings formed therethrough adjacent to said first named opening and said sealing members having fastening tabs adapted to be projected through said second named openings and then bent flatwise against the opposite face of said body, each of said sealing members having flaps bendable toward said body after said sealing members have been bent across the ends of said bolts.

2. A number plate comprising a flat body having a pair of extending sealing members joined integrally to the body by weakened portions at the junctures of said sealing members and the body, said body having horizontal slots adjacent to said sealing members and having other apertures adjacent to said slots, said sealing members being adapted to be bent along said weakened portions across the ends of bolts which have been projected through said slots, said sealing members having tabs at the free edges thereof adapted to be projected through said apertures and then bent flatwise against the opposite face of the body.

3. A number plate comprising a flat body having a pair of extending sealing members joined integrally to the body by weakened portions at the junctures of the sealing members and the body, said body having horizontal slots adjacent to said sealing members and having other apertures adjacent to said slots, said sealing members being adapted to be bent along said weakened portions across the ends of bolts which have been projected through said first named slots, said sealing members having tabs at the free edges thereof adapted to be projected through said apertures and then bent flatwise against the opposite face of the body, each of said sealing members having end portions formed with convexly curved edges and adapted to be bent toward the plane of said body when said sealing members have been bent across the adjacent ends of said bolts, whereby said sealing members cooperate with portions of said body to provide housings for the adjacent ends of said bolts and for nuts on said bolt ends.

4. In combination an automobile license plate, a bendable sealing element extending from one edge of the plate and connected to the latter by weakened portions and arranged to be bent to overlie the plate and surround a removable fastening element engaged with the plate, the sealing element becoming detached from the plate along the weakened portions upon bending the sealing element to a position to uncover the fastening element.

5. In combination a metallic plate, a brittle metallic sealing member formed along one edge thereof and normally disposed in the same plane as the plate and adapted to be bent to overlie the outer face of the plate to house a removable fastening projecting from and securing the plate to a support said sealing element becoming detached from the plate upon being bent to a position to expose the fastening.

WILLIAM H. FLUKER.